US012561162B2

(12) United States Patent
Jasionowski et al.

(10) Patent No.: US 12,561,162 B2
(45) Date of Patent: Feb. 24, 2026

(54) AUTOMATED INFORMATION TECHNOLOGY INFRASTRUCTURE MANAGEMENT

(71) Applicant: KYNDRYL, INC., New York, NY (US)

(72) Inventors: Pawel Jasionowski, Wroclaw (PL); George E. Stark, Austin, TX (US); Firas Bouz, Lexington, KY (US); Christopher Daniel Reech, Austin, TX (US)

(73) Assignee: Kyndryl, Inc., New York, NY (US)

( * ) Notice: Subject to any disclaimer, the term of this patent is extended or adjusted under 35 U.S.C. 154(b) by 549 days.

(21) Appl. No.: 18/062,207

(22) Filed: Dec. 6, 2022

(65) Prior Publication Data

US 2024/0184618 A1     Jun. 6, 2024

(51) Int. Cl.
*G06F 9/48* (2006.01)
*G06F 11/07* (2006.01)

(52) U.S. Cl.
CPC .......... *G06F 9/4806* (2013.01); *G06F 11/079* (2013.01)

(58) Field of Classification Search
CPC .. G06F 9/4806; G06F 9/4818; G06F 9/44526; G06F 9/4491; G06F 11/079; G06F 11/07; G06F 11/00706; G06F 11/261; G06F 11/3442
See application file for complete search history.

(56) References Cited

U.S. PATENT DOCUMENTS

| | | | |
|---|---|---|---|
| 6,401,055 B1 | 6/2002 | Petta | |
| 6,978,245 B1 | 12/2005 | Tsuchiya et al. | |
| 7,752,156 B2 | 7/2010 | Stich et al. | |
| 9,940,125 B1 | 4/2018 | Espy et al. | |
| 11,861,263 B1 * | 1/2024 | Hunt | G06F 3/0481 |
| 2012/0331036 A1 | 12/2012 | Duan et al. | |
| 2016/0269313 A1 * | 9/2016 | Brooker | G06F 9/5083 |
| 2018/0248754 A1 | 8/2018 | Guven et al. | |
| 2019/0347592 A1 | 11/2019 | Huneycutt et al. | |
| 2020/0104402 A1 * | 4/2020 | Burnett | G06F 16/288 |
| 2022/0203523 A1 * | 6/2022 | Zhang | B25J 9/1664 |
| 2022/0253722 A1 * | 8/2022 | Wu | G06Q 30/0631 |
| 2022/0398178 A1 * | 12/2022 | Chopra | G06F 11/0709 |
| 2023/0020268 A1 * | 1/2023 | Pakatci | G06F 3/0634 |

FOREIGN PATENT DOCUMENTS

| | | | |
|---|---|---|---|
| WO | 2002088877 A2 | 11/2005 | |
| WO | 2008008071 A1 | 1/2008 | |

OTHER PUBLICATIONS

Anonymous, "Method and Associated Systems for Automated Consumption, Management, and Impact tracking of Analytics' Recommendations", IP.com, IPCOM000247232D, Aug. 17, 2016, 3 pgs.

* cited by examiner

*Primary Examiner* — Thomas C Lee
(74) *Attorney, Agent, or Firm* — Erik Swanson; Andrew D. Wright; Calderon Safran & Wright P.C.

(57) ABSTRACT

A method, computer program product, and system include a processor(s) that obtains extracts, from a data source, atomic actions. The processor(s) traverses the atomic actions to identify one or more recommended actions. The processor(s) maps the recommended actions to the atomic actions by associating at least one atomic action with an expected improvement level from the data source. The processor(s) generates at least one directed graph based on the mapping. The processor(s) utilizes the matrix to filter the recommended actions, into a best plan nomination.

20 Claims, 6 Drawing Sheets

300

310 — PROGRAM CODE EXECUTED BY ONE OR MORE PROCESSORS EXTRACTS, FROM A DATA SOURCE, ATOMIC ACTIONS IN AN INFRASTRUCTURE

320 — PROGRAM CODE TRAVERSES THE ATOMIC ACTIONS TO IDENTIFY ONE OR MORE RECOMMENDED ACTIONS BASED ON THE ONE OR MORE RECOMMENDED ACTIONS PROVIDING A DEVIATION GREATER THAN A PRE-DEFINED THRESHOLD

330 — PROGRAM CODE MAPS THE ONE OR MORE RECOMMENDED ACTIONS TO THE ATOMIC ACTIONS BY ASSOCIATING AT LEAST ONE ATOMIC ACTION WITH AN EXPECTED IMPROVEMENT LEVEL FROM THE DATA SOURCE

340 — PROGRAM CODE GENERATES, BASED ON THE MAPPING, AT LEAST ONE DIGRAPH

350 — PROGRAM CODE GENERATES, BASED ON THE AT LEAST ONE DIGRAPH, AT LEAST ONE MATRIX THAT INCLUDES ELEMENTS THAT REPRESENT EXPECTED IMPROVEMENT LEVELS OF A PORTION OF THE ONE OR MORE RECOMMENDED ACTIONS

360 — PROGRAM CODE UTILIZES THE AT LEAST ONE MATRIX TO FILTER THE ONE OR MORE RECOMMENDED ACTIONS INTO A BEST PLAN NOMINATION BY SELECTING, FOR THE BEST PLAN NOMINATION, AT LEAST ONE ACTION FROM THE PORTION WITH AN EXPECTED IMPROVEMENT LEVEL THAT IS ABOVE OR EQUAL TO THE PRE-DEFINED THRESHOLD

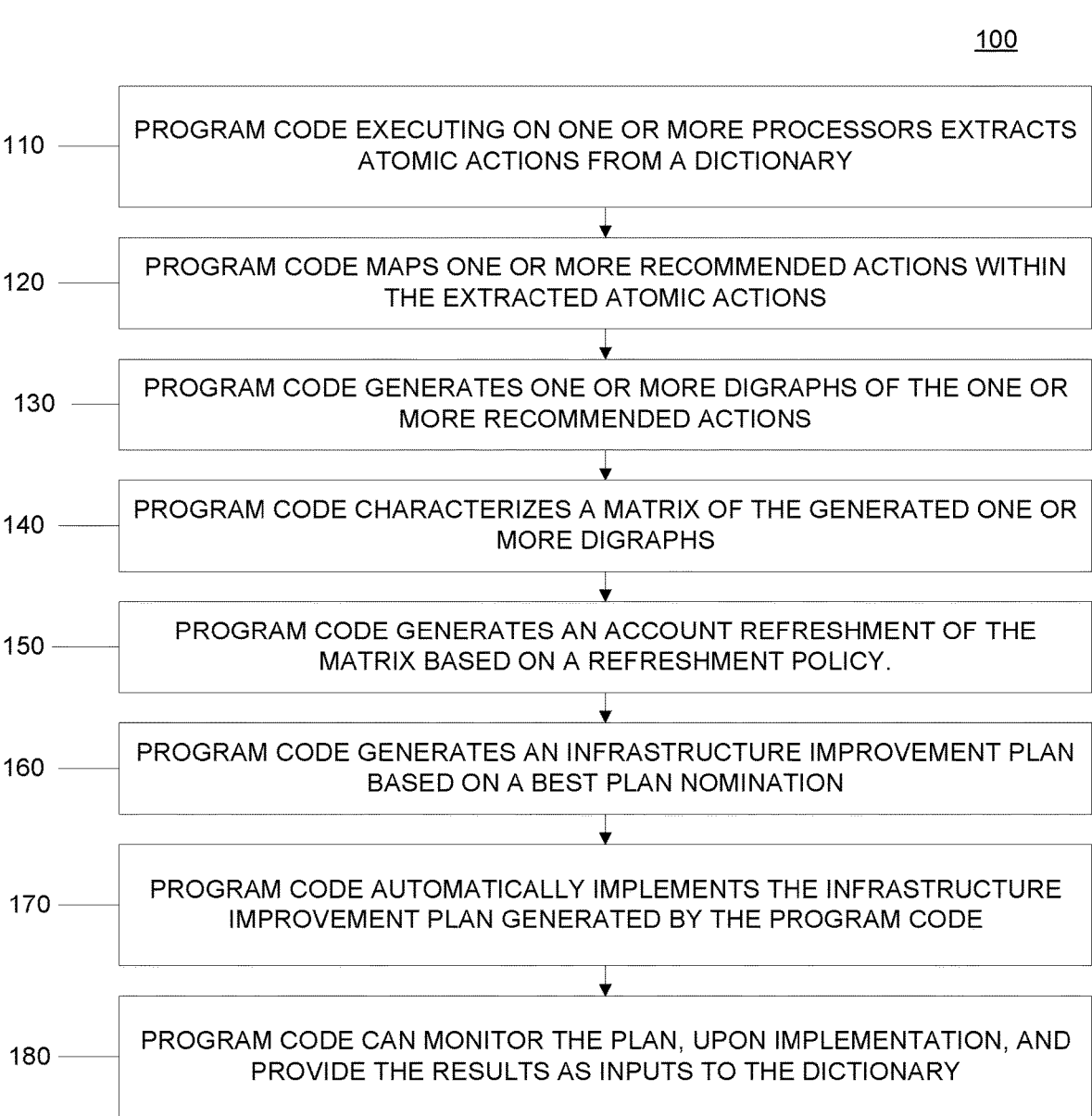

100

110 — PROGRAM CODE EXECUTING ON ONE OR MORE PROCESSORS EXTRACTS ATOMIC ACTIONS FROM A DICTIONARY

120 — PROGRAM CODE MAPS ONE OR MORE RECOMMENDED ACTIONS WITHIN THE EXTRACTED ATOMIC ACTIONS

130 — PROGRAM CODE GENERATES ONE OR MORE DIGRAPHS OF THE ONE OR MORE RECOMMENDED ACTIONS

140 — PROGRAM CODE CHARACTERIZES A MATRIX OF THE GENERATED ONE OR MORE DIGRAPHS

150 — PROGRAM CODE GENERATES AN ACCOUNT REFRESHMENT OF THE MATRIX BASED ON A REFRESHMENT POLICY.

160 — PROGRAM CODE GENERATES AN INFRASTRUCTURE IMPROVEMENT PLAN BASED ON A BEST PLAN NOMINATION

170 — PROGRAM CODE AUTOMATICALLY IMPLEMENTS THE INFRASTRUCTURE IMPROVEMENT PLAN GENERATED BY THE PROGRAM CODE

180 — PROGRAM CODE CAN MONITOR THE PLAN, UPON IMPLEMENTATION, AND PROVIDE THE RESULTS AS INPUTS TO THE DICTIONARY

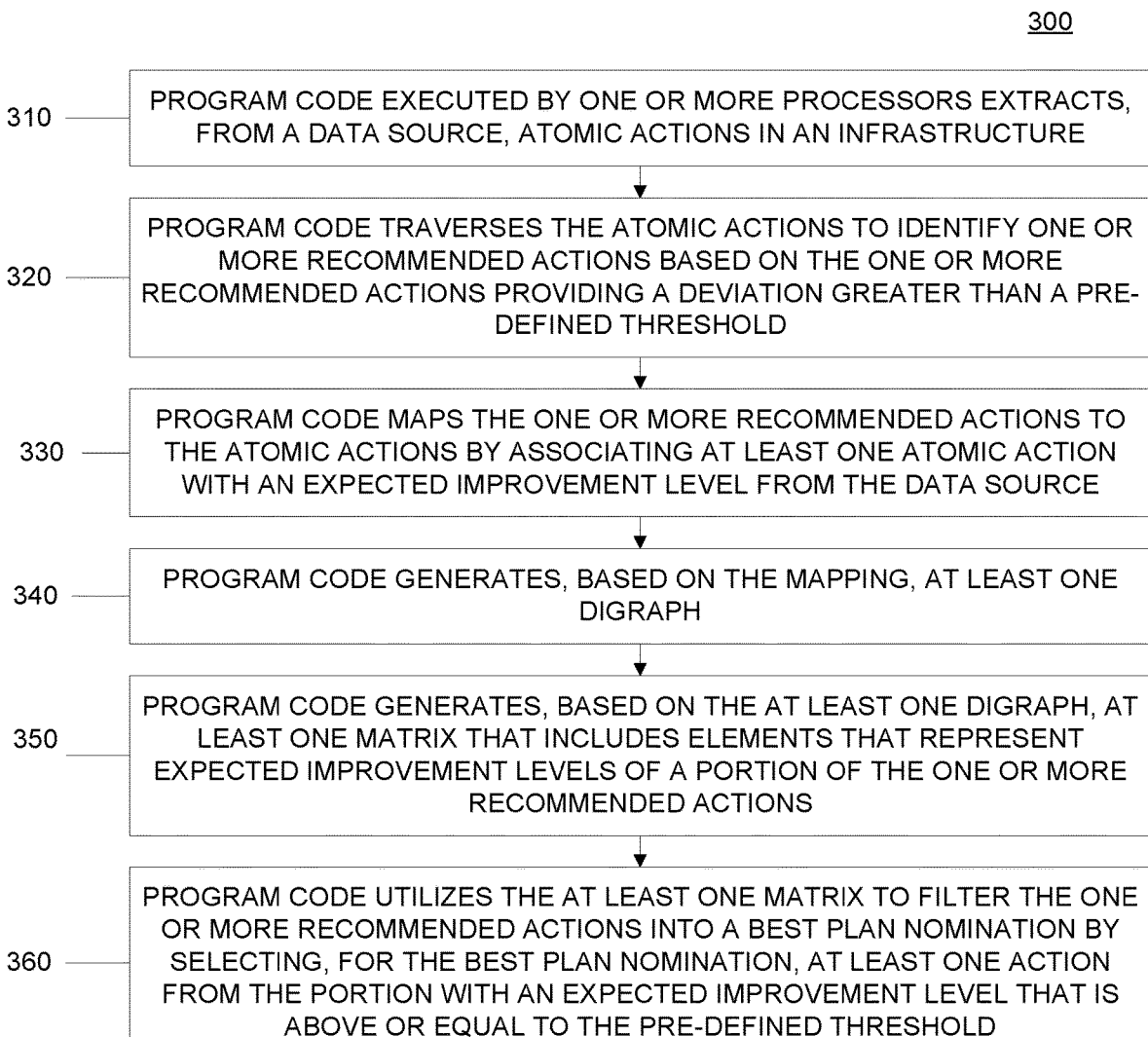

300

310 — PROGRAM CODE EXECUTED BY ONE OR MORE PROCESSORS EXTRACTS, FROM A DATA SOURCE, ATOMIC ACTIONS IN AN INFRASTRUCTURE

320 — PROGRAM CODE TRAVERSES THE ATOMIC ACTIONS TO IDENTIFY ONE OR MORE RECOMMENDED ACTIONS BASED ON THE ONE OR MORE RECOMMENDED ACTIONS PROVIDING A DEVIATION GREATER THAN A PRE-DEFINED THRESHOLD

330 — PROGRAM CODE MAPS THE ONE OR MORE RECOMMENDED ACTIONS TO THE ATOMIC ACTIONS BY ASSOCIATING AT LEAST ONE ATOMIC ACTION WITH AN EXPECTED IMPROVEMENT LEVEL FROM THE DATA SOURCE

340 — PROGRAM CODE GENERATES, BASED ON THE MAPPING, AT LEAST ONE DIGRAPH

350 — PROGRAM CODE GENERATES, BASED ON THE AT LEAST ONE DIGRAPH, AT LEAST ONE MATRIX THAT INCLUDES ELEMENTS THAT REPRESENT EXPECTED IMPROVEMENT LEVELS OF A PORTION OF THE ONE OR MORE RECOMMENDED ACTIONS

360 — PROGRAM CODE UTILIZES THE AT LEAST ONE MATRIX TO FILTER THE ONE OR MORE RECOMMENDED ACTIONS INTO A BEST PLAN NOMINATION BY SELECTING, FOR THE BEST PLAN NOMINATION, AT LEAST ONE ACTION FROM THE PORTION WITH AN EXPECTED IMPROVEMENT LEVEL THAT IS ABOVE OR EQUAL TO THE PRE-DEFINED THRESHOLD

FIG. 3

AUTOMATED INFORMATION TECHNOLOGY INFRASTRUCTURE MANAGEMENT

BACKGROUND

Information Technology Service Management (ITSM) increasingly includes interfacing with a variety of systems that assist in management and execution of work. These systems can include, but are not limited to, ticketing systems, reporting tools, mapping and navigation systems, and knowledge bases. ITSM serves to maintain a stable infrastructure through changes to these interfacing systems and can therefore include system monitoring, patching, disk operations, health checking and other relevant actions. As the numbers of systems and tools that comprise a managed technical infrastructure expand in number, type and complexity, interfacing with these systems and tools creates various IT challenges, including integrating multiple alerts, utilizing reporting functionality, and tracking actions. Centralized management is further challenged when the tools are those of third-party vendors and therefore, interfaces and control of all aspects can be more challenging. Various ITSM challenges that can affect productivity and hinder systems resource optimization include growing backlog, incorrect prioritization and/or distribution to resources, including technicians and computing resources. When availability of resources is guaranteed by service level agreements (SLAs), outages and other conditions that fail to meet the guaranteed levels can impact client satisfaction and cause attrition and sometimes result in paid penalties for resource managers.

SUMMARY

Shortcomings of the prior art are overcome, and additional advantages are provided through the provision of a method for generating and implementing an infrastructure improvement plan. The method includes, for instance: extracting, by one or more processors, from a data source, atomic actions in an infrastructure; traversing, by the one or more processors, the atomic actions to identify one or more recommended actions based on the one or more recommended actions providing a deviation greater than a predefined threshold; mapping, by the one or more processors, the one or more recommended actions to the atomic actions, wherein the mapping comprises associating at least one atomic action with an expected improvement level from the data source; generating, by the one or more processes, based on the mapping, at least one directed graph; generating, by the one or more processors, based on the at least one directed graph, at least one matrix, wherein one or more matrix elements comprising the at least one matrix represents expected improvement levels of a portion of the one or more recommended actions; and utilizing, by the one or more processors, the at least one matrix to filter the one or more recommended actions, into a best plan nomination, wherein the filtering comprises selecting, for the best plan nomination, at least one action from the portion, wherein an expected improvement level of the at least one action is above or equal to the pre-defined threshold.

Shortcomings of the prior art are overcome, and additional advantages are provided through the provision of a computer program product for generating and implementing and infrastructure improvement plan. The computer program product comprises a storage medium readable by a one or more processors and storing instructions for execution by the one or more processors for performing a method. The method includes, for instance: extracting, by the one or more processors, from a data source, atomic actions in an infrastructure; traversing, by the one or more processors, the atomic actions to identify one or more recommended actions based on the one or more recommended actions providing a deviation greater than a pre-defined threshold; mapping, by the one or more processors, the one or more recommended actions to the atomic actions, wherein the mapping comprises associating at least one atomic action with an expected improvement level from the data source; generating, by the one or more processes, based on the mapping, at least one directed graph; generating, by the one or more processors, based on the at least one directed graph, at least one matrix, wherein one or more matrix elements comprising the at least one matrix represents expected improvement levels of a portion of the one or more recommended actions; and utilizing, by the one or more processors, the at least one matrix to filter the one or more recommended actions, into a best plan nomination, wherein the filtering comprises selecting, for the best plan nomination, at least one action from the portion, wherein an expected improvement level of the at least one action is above or equal to the pre-defined threshold.

Shortcomings of the prior art are overcome, and additional advantages are provided through the provision of a system for generating and implementing and infrastructure improvement plan. The system comprises a memory; one or more processors in communication with the memory; program instructions executable by the one or more processors to perform a method. The method can include: extracting, by the one or more processors, from a data source, atomic actions in an infrastructure; traversing, by the one or more processors, the atomic actions to identify one or more recommended actions based on the one or more recommended actions providing a deviation greater than a pre-defined threshold; mapping, by the one or more processors, the one or more recommended actions to the atomic actions, wherein the mapping comprises associating at least one atomic action with an expected improvement level from the data source; generating, by the one or more processes, based on the mapping, at least one directed graph; generating, by the one or more processors, based on the at least one directed graph, at least one matrix, wherein one or more matrix elements comprising the at least one matrix represents expected improvement levels of a portion of the one or more recommended actions; and utilizing, by the one or more processors, the at least one matrix to filter the one or more recommended actions, into a best plan nomination, wherein the filtering comprises selecting, for the best plan nomination, at least one action from the portion, wherein an expected improvement level of the at least one action is above or equal to the pre-defined threshold.

Methods, computer program products, and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 is a workflow that illustrates various aspects of some embodiments of the present invention;

FIG. 3 is a workflow that illustrates various aspects of some embodiments of the present invention;

DETAILED DESCRIPTION

Figure 2:
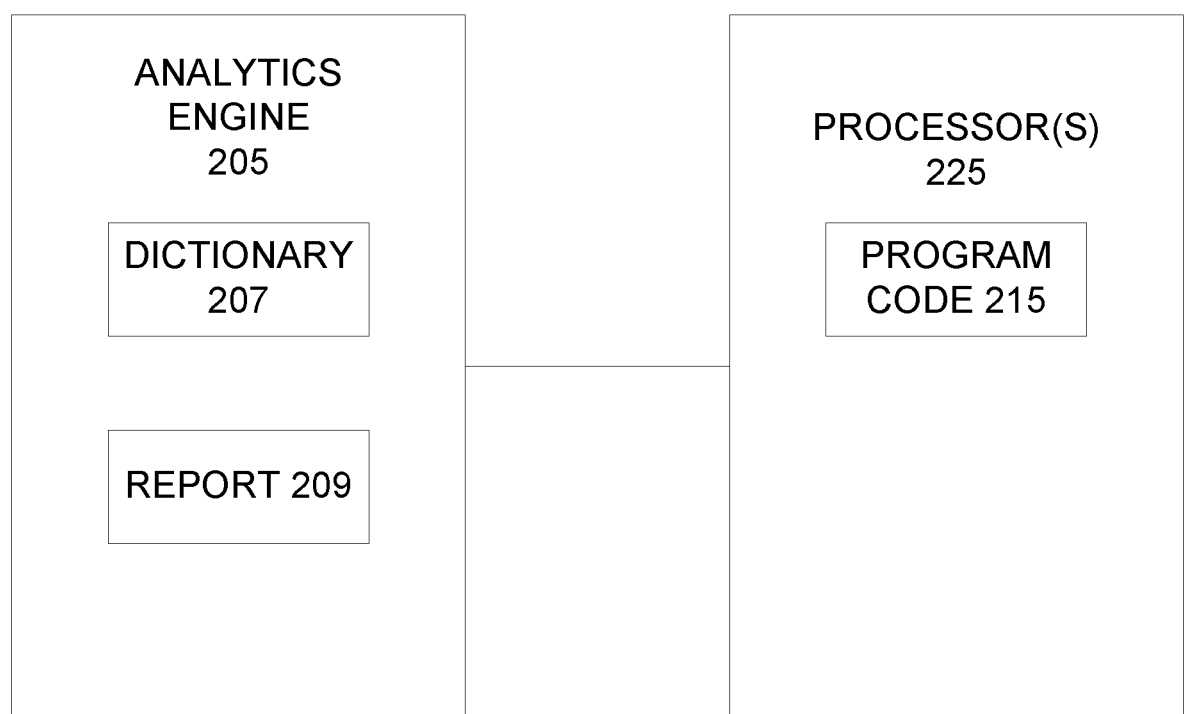
FIG. 2 is an example of a technical environment into which aspects of the present invention can be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
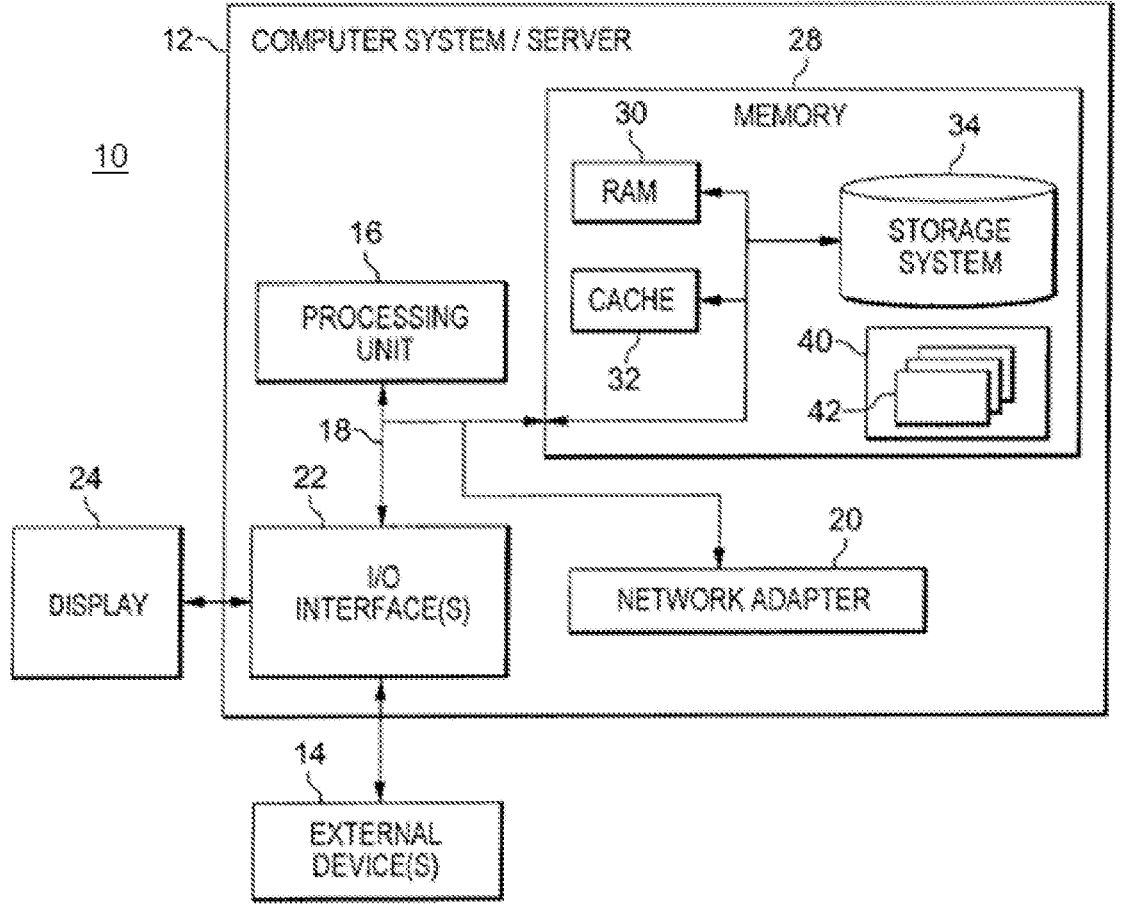
FIG. 4 depicts on embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

In general, ITSM is used to collect health and performance data from one or more technical environments, which can include but are not limited to, servers, virtual machines, containers, databases, and/or other backend components in a technical stack. Engineers can use an infrastructure monitoring tool to visualize, analyze, and alert on metrics and understand whether a backend issue is impacting users. For example, ITSM tracks the availability, performance, and resource utilization of hosts, containers, and other backend components. Infrastructure monitoring provides visibility into the health of backend components, which ensure that critical services are available for users. Existing ITSM tools can monitor specific systems and provide recommendations for improvements when issues arise. An ITSM tool can detect an issue (e.g., a port allocation failure), provide a description to a network engineer, (e.g., the allocation failure occurred because the total ports available on a SNIP (Subnet IP Address) are exhausted) and provide a recommended action (e.g., add another SNIP in the same subnet). However, many recommendations from an ITSM tool address a specific issue and because technical environments can include many different systems, the impacts of addressing one issue can adversely affect another part of the technical environment and/or the recommended action may not be the best approach to ensure performance of critical systems in the context of the entire technical infrastructure.

Various embodiments of the present invention include a computer-implemented method, a computer program product, and a computer system, where program code executing on one or more processors manage various systems within a computing environment by automatically consumes and implements IT infrastructure analytics recommendations (e.g., in the example above, add another SNIP in the same subnet), including but not limited to, recommendations generated by the program code using matrix characterizations of directed graphs (digraphs). Thus, in embodiments of the present invention, the program code extracts atomic operations, maps the operations to recommendations, generates a data structure based on the recommendations to determine an improvement plan, and implements the improvement plan. As understood by one of skill in the art, atomic operations in concurrent programming are program operations that run completely independently of any other processes. Atomic operations are used in operating systems and parallel processing systems. A directed graph (digraph) is a set of vertices and a collection of directed edges that each connects an ordered pair of vertices. A directed edge points from the first vertex in the pair and points to the second vertex in the pair. For example, a digraph can be an ordered pair of sets G=(V, A), where Vis a set of vertices and A is a set of ordered pairs (called arcs) of vertices of V. In the example, G1, given above, V={1, 2, 3}, and A={<1, 1>, <1, 2>, <1, 3>, <2, 3>}. Thus, a binary relation on a set can be represented by a digraph.

A measure of whether ITSM is successful and effective can be based upon key indicators. These key indicators are quantifiable measures over time for a specific objective. The examples discussed herein generate and implement a plan to improve and maintain an IT environment based on results from a system that monitors key indicators in that IT environment. The program code in the examples herein then determine the efficacy of the plan (enabling updates for future improvement), based on continuing to monitor these key indicators. Key indicators can include key performance indicators (KPIs) which, as quantifiable measures of performance include, but are not limited to, response time, time to resolve, time to complete action, percent of available capacity at the IT level, probability of component failure, and revenue growth, revenue per client, profit margin, client retention rate, and customer satisfaction at the business level. A customer can define a key indicator, including in an SLA, by determining what it considers a successful process execution and defining and measuring values based on this benchmark. Certain standard KPIs are utilized in ITSM to monitor and control processes within the managed environment. Key indicators can vary based on factors including, but not limited to, the contextual characteristics of ITSM of an enterprise, the criticality of an IT service as related to business success, whether an indicator can be readily ascertained, Embodiments of the present invention are inextricably tied to computing at least because the examples herein provide a technical solution to an issue unique to computing. ITSM is a challenge as computing systems grow and expand. To manage an effective computing environment, including a cloud computing system and/or a distributed computing system, which can include a variety of disparate resources utilizes by different clients for different purposes, as well as both proprietary and third-party computing systems, the maintenance of the system including assuring performance parameters within the infrastructure (as a whole) can present various technical challenges. The examples herein comprise program code that can generates an infrastructure improvement plan based on a best plan nomination and can automatically implement this plan. Thus, aspects of examples herein improve the functionality of a computing system and are directed to providing this technical improvement.

Embodiments of the present invention provide significantly more than existing ITSM-assistance approaches. For example, in certain of the examples provided herein, program code executing on one or more processors generate a matrix and utilize a characterization of one or more directed graphs to improve automated consumption of IT Infrastructure recommendations. Certain examples herein also represent an improvement by including program code that utilizes a data source that stores a mapped dictionary of primitive actions describing how each action can be fulfilled to generate and implement the recommendations. As understood by one of skill in the art, a primitive action is a basic interface or segment of code that can be used to build more sophisticated program elements or interfaces. Embodiments of the present invention also include improvements to ITSM and optimization of complex computing systems through the automated derivation and implementation of recommendations for improvements at an atomic action (e.g., granular) level. Another advantage provided by aspects of the examples herein is that these examples provide a full-cycle approach to ITSM from program code generating an optimized plan (e.g., most cost effective and/or probable plan of improvement) for an IT service environment, to the program code managing this plan, including through completion by automatically fulfilling actions and/or facilitating their fulfillment, to the program code generating a fulfilment plan, to the program code implementing continual service improvement by monitoring/measuring impacts of the plan (e.g., including at specific intervals such as daily, weekly, monthly, etc.) and feeding the impacts back into a data source (e.g., a dictionary), which the program code can analyze to make additional recommendations for an improved plan.

As used herein, the term "dictionary" is used generally to represent a data source (e.g., a database) and/or a structure of data (e.g., table, view, etc.) in a data source.

FIG. 1 is a workflow 100 that includes an overview of various aspects of some embodiments of the present invention. These aspects are expanded on further herein. FIG. 2 illustrates aspects of a technical environment 200 into which the aspects discussed in the workflow 100 of FIG. 1 can be implemented. FIG. 3 is a workflow 300 that illustrates certain aspects of some examples disclosed herein.

As noted above, in embodiments of the present invention, program code generates and implements an improvement plan for an IT system, also referred to herein as an infrastructure. The infrastructure is comprised of various systems that are integrated to create a cohesive infrastructure that meets the computing resource needs of one or more consumers of its resources. Some of the systems can be third party systems. Thus, as illustrated in the workflow 100 of FIG. 1, program code executing on one or more processors extracts atomic actions from a dictionary (110). The program code maps one or more recommended actions within the extracted atomic actions (120). The program code generates one or more digraphs of the one or more recommended actions (130). These recommended actions are referred to as transversals (i.e., a set which contain exactly one element from some member of the defined collection). The program code characterizes a matrix of the generated one or more digraphs (140). The program code generates an account refreshment of the matrix based on a refreshment policy (150). The program code generates an infrastructure improvement plan based on a best plan nomination (160). In some embodiments of the present invention, the program code automatically implements the infrastructure improvement plan generated by the program code (170). The program code can monitor the plan, upon implementation, and provide the results as inputs to the dictionary (180). Each aspect of this workflow 100 will be discussed in greater detail.

Certain embodiments of the present invention build upon results from existing predictive analytics systems. Some examples utilize existing analyses as input and further process and transform this input to generate and implement an optimization plan for the resources of a computing infrastructure that can include, but is not limited to, an enterprise computing system, a cloud computing system and/or a distributed computing system.

As illustrated in FIG. 1, extracts atomic actions from a dictionary (110), this dictionary can be generated by an analytics engine which is gathering and visualizing an IT service infrastructure. An analytics engine creates key indicators relative to the current and historical situation of an IT environment. Using a list of potential changes to the environment, the analytics engine defines remediation or modernization actions based on the key indicators. The key indicators can include key performance indicators (KPIs). Thus, the analytics engine delivers quantified improvements from each suggested action. For example, the analytics engine may be collecting measurements related to a component of the environment, including but not limited to, a network load balancer. The analytics engine can collect the configuration parameters of the device such as the make/model, operating system (OS) and available capacity. The analytics engine can also collect information on the workload of the device such as the data transfer rates, time to complete a process; collect information on the quality of the device performance such as the number and type of incidents that are logged against the device. Using this data, the analytics engine can predict a time to next failure with a recommendation to divert the workload to a redundant device or highlight recommended service actions such as upgrade operating system or add capacity. As another example, some existing analytics systems study a history of server incidents, in a given environment, and statistically correlates incident details with a history of utilization as well as configuration details of the same server set on the same environment. This existing system can classify servers into one of several problematic areas and statistical simulation models on the developed understanding to recommend modernization options and quantify the expected benefits, in terms of problem reduction, for each option or combination of options. Embodiments of the present invention utilize the findings of an analytics engines as a starting point in generating and implementing an improvement plan for a given IT infrastructure.

The program code can obtain the results from this analytical analysis system and/or others as an input and utilize these data to provide further improvements. For example, these data can comprise the dictionary from which the program code extracts atomic actions (e.g., FIG. 1, 110). In various examples herein, this dictionary is a defined dictionary of primitive actions, also referred to as atomic actions, describing where each action includes a description of how that action can be fulfilled. The dictionary can include a list of atomic actions and for each atomic action, instructions for implementation of the atomic action in the technical environment. For example, an action could be to add more memory (physical or virtual) to a server, or to allocate more storage, or to purchase a new physical server, etc. Thus, in some embodiments of the present invention, the dictionary comprises (at least partially) an analytics engine improvement actions report generated by an existing analytics system. In some embodiments of the present invention, the program code extracts atomic actions from the analytics engine itself. As aforementioned, the program code can extract atomic actions form an existing analytics engine and/or a report produced by the engine. As explained below, although the program code utilizes an analytics engine as a dictionary of atomic actions, rather than utilize the analytics engine's recommendations for system improvements (e.g., optimization) without further analysis, the program code traverses one or more sets to select the recommended actions proposed by the analytics engine.

Returning to FIG. 1, as noted above, program code executing on one or more processors extracts atomic actions from a dictionary (110). In some examples, the program code extracts these actions from the analytics engine improvement actions report by using a transversals concept in which the program code identifies deviations greater than "normal" variation as a combined set of key indicators. This dictionary, in some examples, is a finite list of atomic actions which the program code can obtain from an analytics engine improvement actions report and/or the analytics engine itself. These atomic actions can represent steps (actions) that the program code or another resource (e.g., human operator, system) can execute on a component of the technical infrastructure. Atomic actions can include, but are not limited to: patching an operating system (OS) image, allocating additional space on a network-attached storage device, and/or mapping newly allocated space to an existing database, etc. Each action in a dictionary includes attributes utilized for its fulfillment. A given action can be listed together with role and a linkage to a pool of resources to draw from, both of which can be assigned to an action. Attributes of an action can also include, but are not limited to expected effort and duration, prerequisites (input), and/or deliverables (output).

In some examples, the program code, as part of extracting atomic actions (110), divides atomic actions into subsets. For example, one can represent a set of atomic actions as Ato={a_1, a_2, . . . , a_n}. This set represents all atomic actions the program code extracts from the analytics engine (110). The program code can divide the set of all atomic actions into groups or subsets, based on various parameters, including but not limited to, configuration item, activity group, or skill level. Subsets can be represented as follows: SubAto={a_1, a_2}, {a_3, a_4, a_5}, . . . , {a_n}. The program code can divide atomic actions into subsets placing actions in subsets based on the program code determining that these actions are similar but differ based on an amount of recommended addition or improvement level. (An improvement level of a recommendation can include a predicted probability of success and/or an improvement of a particular key indicator upon implementation of a recommendation.) For example, the program code could group the following actions in the same subset, {a_1, a_2}, if a_1="Add memory 2 GB" and a_2="Add memory 4 GB". Thus, both these atomic actions include allocating additional space on a network-attached storage device, but they vary in the amount of space that the action allocates.

The program code traverses one or more sets to select the recommended actions proposed by the analytics engine, including in the analytics engine improvement actions report. This traversal can be understood as the program code seeking and identifying deviations greater than a (predefined) normal variation as the combined set of key indicators. These deviations are referred to herein as improvements. As noted above, Ato={a_1, a_2, . . . , a_n} is a collection (set) of atomic actions and SubAto is a division (subset) of the collection (set). Transversal r is a set which contain exactly one element from some member of the collection SubAto. In some examples, the transversal r does not contain an element from some set from SubAto. A set of all transversals for a considered analytics engine recommendation is denoted as Tra. For example, for Ato={a_1, a_2, . . . , a_7} and SubAto={a_1, a_2}, {a_3, a_4}, {a_5, a_6}, {a_7} an example of a transversal is r={a_2, a_3, a_6, a_7}. A recommendation from the analytics engine is transversal Tra over a set of atomic actions.

Referring to FIG. 1, once the program code has extracted the atomic actions ( )(110), the program code maps one or more recommended actions within the created transversals (120). The program code can map key indicators from the analytics engine to the associated recommended action items in the dictionary. These indicators can be obtained, for example, based on an analytics engine improvement actions report generated by an existing analytics system. As noted above, the program code traverses the one or more sets to select the recommended actions proposed by the analytics engine. Thus, in this example, Ato={a_1, a_2, . . . a_n} is a collection of atomic actions extracted from analytics engine, SubAto is a division of this collection, and the program code utilizes the recommendations proposed by the analytics engine (e.g., an analytics engine improvement actions report), to generate a transversal (r) over a set Ato. A set of all transversals (recommended improvement actions) proposed by the analytics engine can be represented by {r_1, r_2, . . . , r_m}. When mapping the recommended actions with the atomic actions (120), the program code associates a number $\alpha(r_i)$ with each transversal $r_i$ which represents the expected improvement level associated with a considered improvement action. The program code obtains the expected improvement level from the analytical engine as the analytical engine monitors key indicators to predict these expected levels.

The program code generates a digraph of recommended improvement actions and a matrix of this graph, where each element of matrix represents an improvement level associated with the represented action. As illustrated in FIG. 1, the program code creates a digraph of all recommended improvement actions by generating one or more digraphs of transversal (i.e., a set which contain exactly one element from some member of the defined collection) correspondence (130). Thus, the program code identifies this traversal correspondence to generate one or more digraphs. The program code both generates a digraph of traversal correspondence and a matrix characterization of each transversal's digraph. To this end, the program code defines as vertices of the digraph as elements of the set Ato={a_1, a_2, . . . , a_n}. The directed edge of the graph exists if and only if there exists a transversal $r_i$ of the set Ato.

The program code utilizes each graph to graphically represent a collection of dependencies and thus, generates a matrix M of the graph (e.g., FIG. 1, 140). In this example, a dimension of the matrix is equal to the n×n× . . . ×n where number of ns is taken as a maximum length of the transversal r from Tra. For example, a matrix with dimension n×n corresponds to proposed recommendation actions which are a collection (set) of a maximum of 2 atomic actions. Each matrix element $a_{(i\_1, . . . , i\_n)}$ of the matrix M represents an improvement level associated with transversal $r_{(i\_1)} . . .$ and $r_{(i\_m)}$. In various embodiments, different lengths of traversals can provide flexibility when utilizing, for dictionary content, different analytics engines and different sets of atomic actions.

The program code generates an account refreshment policy (Arp) digraph which represents a probability of a successful implementation of each improvement action based on account refreshment plans and cost functions. These cost functions can be pre-configured and can be based on various parameters related to individual customers. The program code generates this account refreshment of the matrix based on a refreshment policy (150). The account refreshment policy is a best plan nomination. To generate an account refreshment policy digraph (Arp), the program code can associate each atomic action from the set Ato with a number from a range [0,1] which represents the probability (likelihood) of implementing this particular action by a considered account (e.g., individual customer or consumer of resources of the technical architecture). In some examples, the program code can instead utilize percentage ranges [0%, 100%]. The program code can define each likelihood by utilizing pre-defined data provided to the program code, including but not limited to, account policy, and/or cost functions provided by the account and business factors. As discussed earlier, the vertices of the graph are elements of set Ato and the program code associates each vertex with a likelihood value. For each r from Tra, the program code defines a route in the graph it generated. The program code determines a likelihood of each route by multiplying numbers attached to each vertex on the route. Thus, the program code generates matrix MArp where each item represented is a probability connected with a particular route. If the probability cannot be defined in this manner, the program code designates the probability as 0.

In some examples, customers of a given IT architecture provide data related to various atomic actions which the program code utilizes in determining the probabilities. For example, a user of the architecture can provide associated costs, effort, and/or improvement level values on the diagonal. Utilizing these entries, the program code can calculate the refreshment policy applying a formula $a\_ij=a\_ii*a\_jj$.

To increase flexibility, in some embodiments of the present invention, a user can make a manual adjustment, including through a graphical user interface (GUI) generated by the program code. For example, an account of a given customer may be subject to a special circumstance that would impact the matrix values. For example, if a likelihood of implementation of a given atomic action (e.g., an operating system refresh) is 0.8 and likelihood of implementation of another atomic action (e.g., adding 2 GB of memory) is 0.5, then concatenated transversal {first atomic action, second atomic action}(e.g., {OS refresh, add memory+2 GB}) would be 0.4 according to the algorithm. But if there is an additional factor, including but not limited to, a refreshment plan that includes triggering implementation of these actions across all servers in the technical environment (e.g., all servers with OS refresh would automatically have memory add for this account) because of business decisions (pre-defined and obtained by the program code) and a likelihood of such action is 1, then a user can replace this item in the matrix with a value of 1.

Referring to FIG. 1, the program code generates an infrastructure improvement plan based on a best plan nomination (160). A significant improvement of the present ITSM approach over existing techniques is that in certain of the examples herein the program code automatically creates this infrastructure improvement plan. By using Arp matrix as a filter, the program code nominates the best and most probable improvement actions from M (the matrix) to automatically create an aggregate fulfillment plan. The program code filters the matrix recommendations by: 1) multiplying both matrices $a\_ij*b\_ij$; and 2) deleting all entries which are under a pre-defined threshold. The threshold is specific for each account and is set in advance, for examples, in an SLA. The program code can order the actions it filters and identified, for example, in an aggregated and/or concatenated list of items. The aggregate list comprises the plan and can include attributes associated with managing/implementing the plan, including but not limited to associated technical group, skill level, and and/or timing.

The program code fulfills and/or facilitates fulfilment the plan. In some embodiments of the present invention, the program code automatically implements the infrastructure improvement plan generated by the program code (170). As illustrated in FIG. 1, the program code can automatically fulfill the plan, for example, by allocating more resources to a virtual appliance if permitted by policy and supported programmatically. Thus, in some examples, the program code produces and manages the plan. The program code can fulfill various tasks (list items) through completion, utilizing various resources of the IT infrastructure. In some examples, user intervention is requested by the program code to fulfill some or all of the plan. In the list (plan), action can be performed by a person or by a group of people (e.g., a user of a given role). The program code can facilitate completion of this type of task by automatically generating a ticket in a ticketing system and assigning the task to an appropriate groups of individuals. For example, an action, which is part of a modernization recommendation by an incident reduction predictive analytics tool, could be refreshing a given server in the managed infrastructure. Thus, in various embodiments of the present invention, the program code can facilitate the plan by fulfilling the plan (e.g., through autonomous execution of tasks including automatically allocating more storage if permitted by an account policy), and/or by dispatching the recommendation to humans for execution (e.g., notifying a human operator to purchase a physical server). The program code can also monitor progress through the key indicators.

The efficacy of the plans generated and implemented by the program code can increase over time based on the program code monitoring the key indicators, including by utilizing the analytics engine for this monitoring. The program code can monitor the plan, upon implementation, and provide the results as inputs to the dictionary (180). Each implemented recommended carries with it an efficacy forecast in the form of a likelihood or probability. The program code monitors each task implemented automatically and/or assigned to a resource for implementation. The program code determines whether the actual efficacy of the task matched the predicted efficacy. If the actual efficacy does not match the predicted efficacy (either based on a pre-determined threshold or an exact match depending on the configuration), the program code can update the task in the analytics engine to reflect the actual efficacy. Thus, moving forward, the program code can utilize this updated value when extracting atomic tasks from the dictionary. This self-learning and tuning aspect can be understood as a continual service improvement element. In some examples, the program code publishes the results of the monitoring, the observations of the program code, in a format consumable by the analytics engine. It is this format that the program code provides to the analytics engine such that the analytics engine can update itself based on consuming this output.

FIG. 2 is a diagram of aspects of a technical environment 200 that can be utilized to perform aspects of the techniques described herein. Certain references to aspects of the workflow 100 of FIG. 1 are made in the description of the technical environment 200 of FIG. 2 for illustrative purposes. As discussed above, an analytics engine 205 within a technical environment 200 provides program code 215 executed by one or more processors 225 with a dictionary 207 from which to extract atomic actions (110). For ease of understanding, the program code 215 is depicted as a singular entity executing on processors 225 at a given location, but as understood by one of skill in the art, both the program code 215 as well as the processors 225 can be distributed across various resources of a technical environment 200. For example, the technical environment 200 can be an enterprise system that a distributed system, including but not limited to a cloud computing environment. Thus, the program code 215 cannot only be executed by different resources across the technical environment 200, it can also execute on different resources depending upon when it is executed, as controlled by various workload distribution mechanisms within the technical environment 200. In technical environment 200, the analytics engine 215 is depicted as being part of the technical environment 200. However, the analytics engine 215 can execute on resources outside of the technical environment 200 and monitor the resources within the technical environment 200 in some embodiments of the present invention.

The program code 215 obtains an analysis of key indicators from the analytics engine 205, including in the form of an analytics engine improvement actions report 209. The key indicators are recommended actions and the program code 215 maps the one or more atomic actions (120). The program code 215 utilizes the mappings to generate various data structures (digraphs and a matrix) which it utilizes to evaluate the efficacy of the recommendations and based on identifying the recommendations which the analytics engine predicted to be most effective, generates an implementation plan (130), (140), (150). The program code 215 implements and/or manages the implementation of the plan. The program code 215 can then monitor the implementation, as described above, and generate a result consumable by the analytics engine 205. The program code provides the results to the analytics engine 205 such that the analytics engine 205 can utilize the result to update one or more of the dictionary and the dictionary 207 and the analytics engine improvement actions report 209.

FIG. 3 is a workflow 300 that illustrates certain aspects with some variations from FIG. 1 to illustrate aspects of the breadth of the examples herein. As illustrated in FIG. 3, program code executed by one or more processors extracts, from a data source, atomic actions in an infrastructure (310). The program code traverses the atomic actions to identify one or more recommended actions based on the one or more recommended actions providing a deviation greater than a pre-defined threshold (320). The program code maps the one or more recommended actions to the atomic actions by associating at least one atomic action with an expected improvement level from the data source (330). The program code generates, based on the mapping, at least one digraph (340). The program code generates, based on the at least one digraph, at least one matrix that includes elements that represent expected improvement levels of a portion of the one or more recommended actions (350). The program code utilizes the at least one matrix to filter the one or more recommended actions into a best plan nomination by selecting, for the best plan nomination, at least one action from the portion with an expected improvement level that is above or equal to the pre-defined threshold (360).

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In FIG. 2, the analytics engine 205 and the one or more processors 225 can each comprise one or more cloud computing nodes 10 (FIG. 4). In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform specific tasks or implement abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aFlpplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
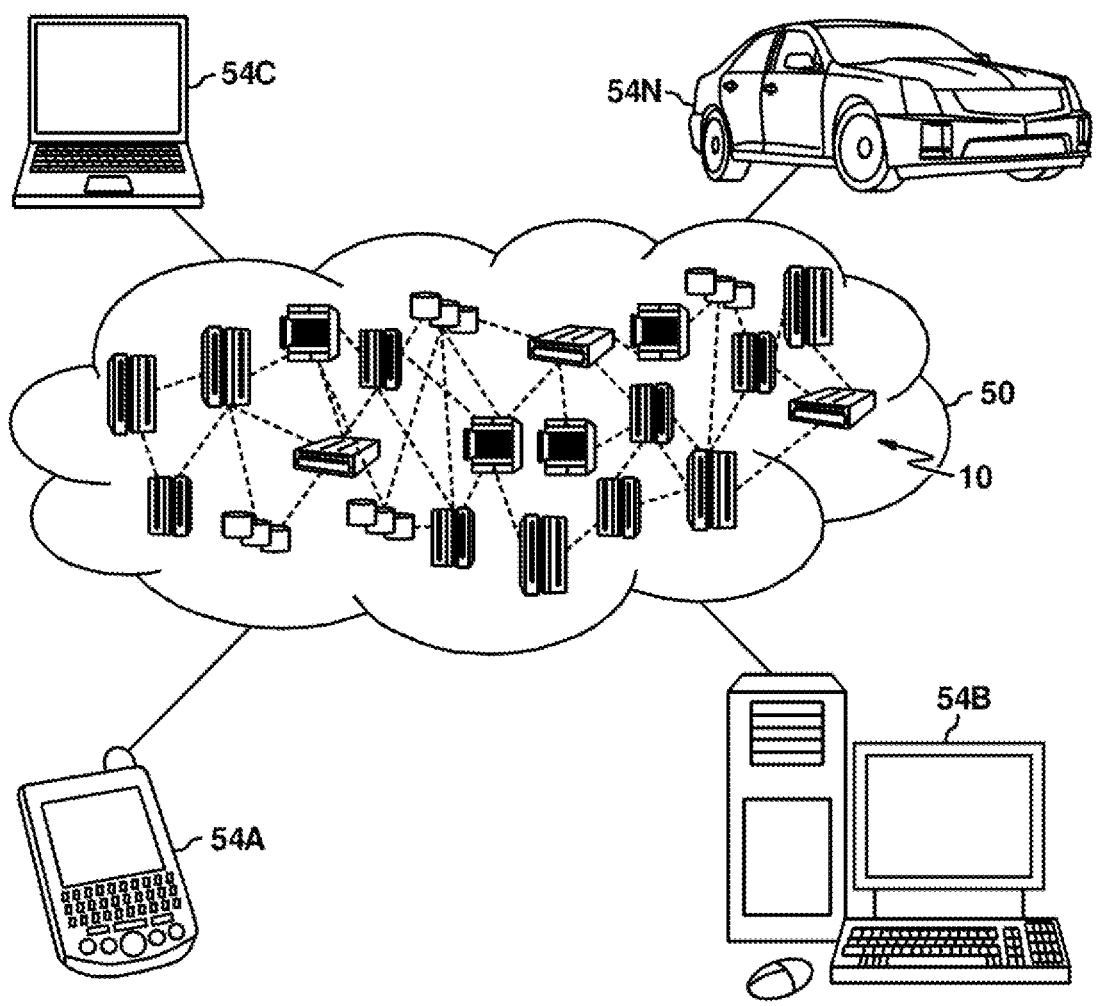
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
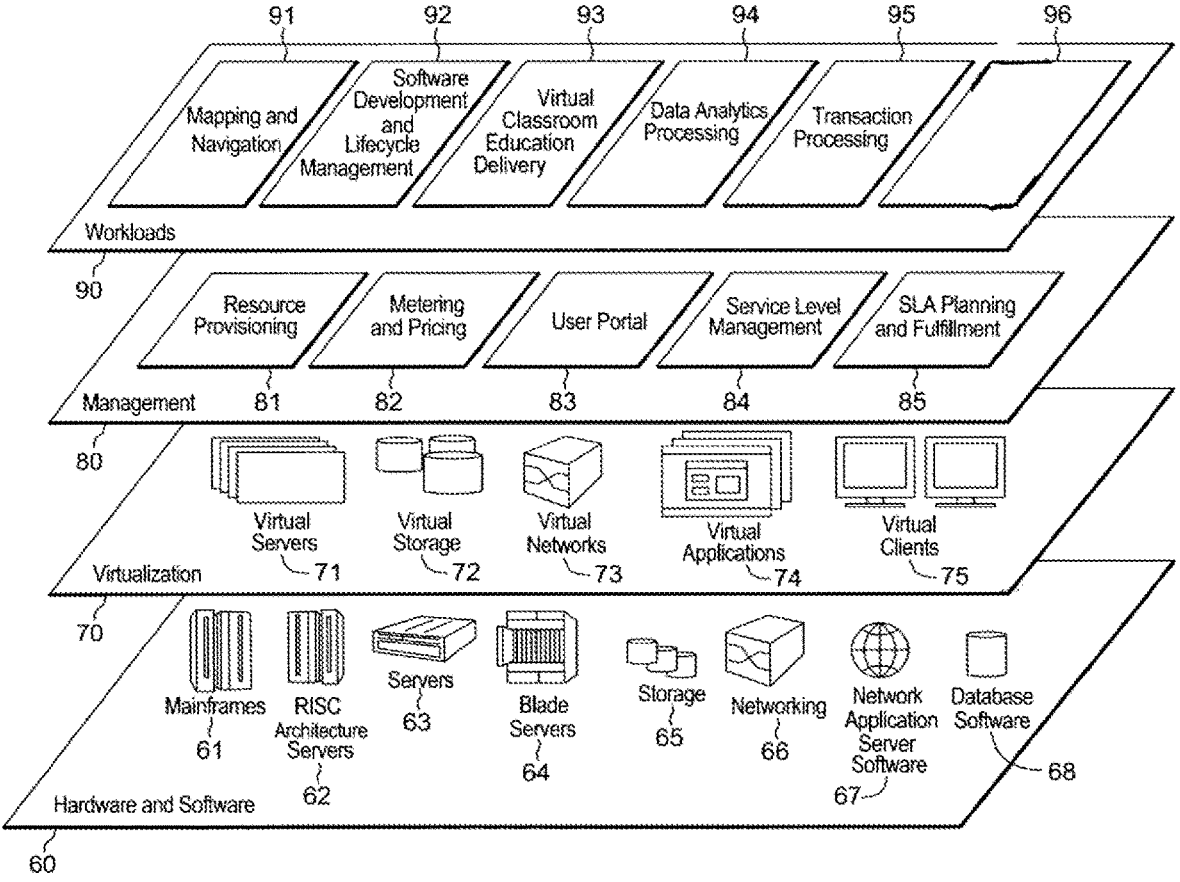
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. Workloads can also include virtual examination centers or online examinations (not pictured).

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating and implementing an infrastructure improvement plan 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:

extracting, by one or more processors, from a data source, atomic actions in an infrastructure;

traversing, by the one or more processors, the atomic actions to identify one or more recommended actions based on the one or more recommended actions providing a deviation greater than a pre-defined threshold;

mapping, by the one or more processors, the one or more recommended actions to the atomic actions, wherein the mapping comprises associating at least one atomic action with an expected improvement level from the data source;

generating, by the one or more processors, based on the mapping, at least one directed graph for each recommended action of the one or more recommended actions;

generating, by the one or more processors, based on the at least one directed graph, at least one matrix, wherein one or more matrix elements comprising the at least one matrix represents expected improvement levels of a portion of the one or more recommended actions;

utilizing, by the one or more processors, the at least one matrix to filter the one or more recommended actions, into a best plan nomination, wherein the filtering comprises selecting, for the best plan nomination, at least one action from the portion, wherein an expected improvement level of the at least one action is above or equal to the pre-defined threshold; and implementing, by the one or more processors, an infrastructure improvement plan based on the best plan nomination.

2. The computer-implemented method of claim 1, wherein the dictionary was generated by an analytics engine analyzing the infrastructure.

3. The computer-implemented method of claim 1, wherein the at least one directed graph comprises vertices, the vertices comprising elements of the extracted atomic actions.

4. The computer-implemented method of claim 3, wherein the at least one directed graph comprises a directed edge, and wherein one or more of the extracted atomic actions are mapped to one or more recommended actions.

5. The computer-implemented method of claim 1, further comprising:

instructing, by the one or more processors, facilitation of the best plan nomination.

6. The computer-implemented method of claim 5, wherein the instructing comprises:

executing, by the one or more processors, the at least one action from the portion in the infrastructure.

7. The computer-implemented method of claim 5, wherein the instructing comprises:

dispatching, by the one or more processors, the at least one action from the portion to users of the infrastructure for completion.

8. The computer-implemented method of claim 5, further comprising:

monitoring, by the one or more processors, the facilitation of the best plan nomination;

comparing, by the one or more processors, after the implementation, an actual improvement level of the at least one action with the expected improvement level above or equal to the pre-defined threshold to generate a result reflecting differences; and generating, by the one or more processors, the result in a format consumable by an analytics engine.

9. The computer-implemented method of claim 8, further comprising:

providing, by the one or more processors, the result to the analytics engine, wherein based on ingesting the result the analytics engine updates the data source.

10. The computer-implemented method of claim 8, wherein the one or more recommended actions are generated by the analytics engine based on monitoring key indicators, and wherein monitoring the implementation of the best plan nomination into the infrastructure comprises monitoring the key indicators.

11. The computer-implemented method of claim 10, wherein the expected improvement level comprises an anticipated percentage of improvement to at least one key indicator of the key indicators.

12. The computer-implemented method of claim 1, wherein the extracting the atomic actions further comprises:

dividing, by the one or more processors, the atomic actions, wherein the atomic actions comprise a set, into one or more subsets of atomic actions, wherein a subset of the one or more subsets, wherein each element in the subset comprises a given action and a given quantity indicator, wherein the given action in each element of the subset is a common action, and wherein the given quantity indicator in each element comprises a unique value, and wherein the traversing comprises traversing the one or more subsets.

13. The computer-implemented method of claim 1, further comprising:

obtaining, by the one or more processors, via a client interface, an expected improvement level for a particular action in the best plan nomination; and adjusting, by the one or more processors, the best plan nomination based on the expected improvement level for the particular action.

14. The computer-implemented method of claim 1, wherein the data source comprises a dictionary, and wherein the dictionary comprises the atomic actions and for at least one atomic action, instructions for implementing the at least one atomic action in the infrastructure.

15. The computer-implemented method of claim 14, wherein the at least one atomic action comprises adding more memory to a server in the infrastructure and the instructions are selected from the group consisting of: allocating storage and purchasing a new physical server.

16. A computer program product comprising:

a computer readable storage medium readable by one or more processors of a shared computing environment comprising a computing system and storing instructions for execution by the one or more processors for performing a method comprising:

extracting, by the one or more processors, from a data source, atomic actions in an infrastructure;

traversing, by the one or more processors, the atomic actions to identify one or more recommended actions based on the one or more recommended actions providing a deviation greater than a pre-defined threshold;

mapping, by the one or more processors, the one or more recommended actions to the atomic actions, wherein the mapping comprises associating at least one atomic action with an expected improvement level from the data source;

generating, by the one or more processes, based on the mapping, at least one directed graph for each recommended action of the one or more recommended actions;

generating, by the one or more processors, based on the at least one directed graph, at least one matrix, wherein one or more matrix elements comprising the at least one matrix represents expected improvement levels of a portion of the one or more recommended actions;

utilizing, by the one or more processors, the at least one matrix to filter the one or more recommended actions, into a best plan nomination, wherein the filtering comprises selecting, for the best plan nomination, at least one action from the portion, wherein an expected improvement level of the at least one action is above or equal to the pre-defined threshold; and implementing, by the one or more processors, an infrastructure improvement plan based on the best plan nomination.

17. The computer program product of claim 16, wherein the dictionary was generated by an analytics engine analyzing the infrastructure.

18. The computer program product of claim 16, wherein the at least one directed graph comprises vertices, the vertices comprising elements of the extracted atomic actions.

19. The computer program product of claim 18, wherein the at least one directed graph comprises a directed edge, and wherein one or more of the extracted atomic actions are mapped to one or more recommended actions.

20. A computer system comprising:

a memory;

the one or more processors in communication with the memory;

program instructions executable by the one or more processors to perform a method, the method comprising:

extracting, by the one or more processors, from a data source, atomic actions in an infrastructure;

traversing, by the one or more processors, the atomic actions to identify one or more recommended actions based on the one or more recommended actions providing a deviation greater than a pre-defined threshold;

mapping, by the one or more processors, the one or more recommended actions to the atomic actions, wherein the mapping comprises associating at least one atomic action with an expected improvement level from the data source;

generating, by the one or more processes, based on the mapping, at least one directed graph for each recommended action of the one or more recommended actions;

generating, by the one or more processors, based on the at least one directed graph, at least one matrix, wherein one or more matrix elements comprising the at least one matrix represents expected improvement levels of a portion of the one or more recommended actions;

utilizing, by the one or more processors, the at least one matrix to filter the one or more recommended actions, into a best plan nomination, wherein the filtering comprises selecting, for the best plan nomination, at least one action from the portion, wherein an expected improvement level of the at least one action is above or equal to the pre-defined threshold; and implementing, by the one or more processors, an infrastructure improvement plan based on the best plan nomination.

*   *   *   *   *